United States Patent [19]

Knight

[11] 4,051,925
[45] Oct. 4, 1977

[54] DISC BRAKES FOR VEHICLES INCLUDING A SCREW-THREADED DRAW BAR ASSEMBLY

[75] Inventor: Peter Charles Knight, Birmingham, England

[73] Assignee: Girling Limited, Birmingham, England

[21] Appl. No.: 734,670

[22] Filed: Oct. 21, 1976

[30] Foreign Application Priority Data

Nov. 11, 1975 United Kingdom ............... 46500/75
July 10, 1976 United Kingdom ............... 28776/76

[51] Int. Cl.[2] .......................................... F16D 55/224
[52] U.S. Cl. ................................. 188/72.4; 188/73.4; 188/73.6
[58] Field of Search ............... 188/73.3, 73.4, 73.5, 188/73.6, 1 R, 72.4, 72.5, 71.1; 85/51, 50 R, 1 K, 32 K, 33; 151/14 R

[56] References Cited
U.S. PATENT DOCUMENTS

| 3,616,876 | 1/1971 | Brooks ............................... 188/73.3 |
| 3,656,590 | 4/1972 | Newstead ....................... 188/73.3 X |
| 3,882,972 | 5/1975 | Newstead et al. ............. 188/73.6 X |

*Primary Examiner*—Trygve M. Blix
*Assistant Examiner*—Douglas C. Butler
*Attorney, Agent, or Firm*—Scrivener, Parker, Scrivener & Clarke

[57] ABSTRACT

In a disc brake of the kind in which the clamping member straddling the disc consists of pressure plates located on opposite sides of the disc interconnected at their outermost ends by draw-bars, each draw bar is provided at at least one end with a screw-threaded portion which is screwed into an open-ended screw-threaded bore in a member and a releasable coupling is provided between the member and the one end of the draw bar.

14 Claims, 4 Drawing Figures

DISC BRAKES FOR VEHICLES INCLUDING A SCREW-THREADED DRAW BAR ASSEMBLY

SPECIFIC DESCRIPTION

This invention relates to improvements in disc brakes for vehicles of the kind in which a first friction pad assembly is adapted to be urged directly into engagement with one face of a rotatable disc by actuating means, and a second friction pad assembly is adapted to be applied indirectly to the opposite face of the disc by the reaction of the actuating means which is applied to the second friction pad assembly through a clamping member straddling a portion of the periphery of the disc and movable axially with respect to a relatively stationary carrier member, the clamping member comprising a yoke assembly consisting of a pair of pressure plates which are chordal to the disc and are located on opposite sides thereof, and circumferentially spaced draw-bars which interconnect the pressure plates at their outermost ends and determine the axial spacing between the pressure plates.

In one known disc brake of the kind set forth at least one end of each draw-bar is threaded and is screwed into a threaded blind bore of a nut until the threaded end engages with the base of the bore which defines a stop and means, for example split pins, are provided to lock the nut against rotation. The stops determine the effective lengths of bars between the pressure plates and hence set the spacing therebetween. The opposite ends of the draw-bars may be formed with integral heads which bear on one of the pressure plates or, alternatively, the said opposite ends may also be screw-threaded and screwed into blind bores in one of the pressure plates.

The provision of blind threaded bores is an expensive operation and requires considerable skill particularly when the depth of a bore is to be controlled within close tolerances. A heading operation is also very expensive, particularly because of the material which has to be used is of high strength.

In our U.S. Pat. No. 3,656,590 a disc brake of the kind set forth is described, in which each draw bar is provided with an integral head at one end and a threaded portion at the other end, an open-ended nut being screwed onto the threaded end. Spherical joints are interposed between the draw-bars and the pressure plates. The working length of each bar is, in this case, individually adjusted and locked by means of lock nuts.

According to our invention in a disc brake of the kind set forth for vehicles each draw-bar is provided at least one end with a screw-threaded portion, and a member in which that end of the draw bar is connected has an open-ended screw-threaded bore into which the screw-threaded portion is screwed, a releasable coupling being provided between the said one end of each draw-bar and the member, and at least one of said couplings comprising an abutment member releasably retained in a groove defined in the member and engaged within a groove in the draw-bar located between the screw-threaded portion and an end portion at the said one end of the draw-bar.

Preferably the diameter of the end portion is less than the diameter of the screw-threaded portion so as to provide space for the abutment member.

The releasable coupling performs two functions namely defining a stop for the said one end of the draw-bar and preventing relative rotation between the member and the draw-bar taking place. Thus the construction is considerably simplified and elaborate maching to produce blind bores is eliminated.

The member may comprise one of the pressure plates or a nut screwed onto the end of a draw-bar which projects through a clearance bore in the other pressure plate.

Preferably screw-threaded portions are provided at both ends of each draw-bar so that one portion is screwed into an open-ended bore in one of the pressure plates and the other portion is passed through a clearance bore in the other pressure plate to receive a nut having an open-ended screw-threaded bore, releasable couplings being provided at both ends of each draw-bar, each coupling comprising an abutment member retained in a groove in one of the bores and engaged within a groove in the draw-bar located between the screw-threaded portion which is received in that bore and an end portion of reduced diameter at that end of that draw-bar. The end portion must be of diameter at least less than the outer diameter of the thread, otherwise it could not be screwed through the threaded bore. If the diameter of the end portion is between the inner and outer diameter of the thread, it must itself have at least partial threads formed on it. If the diameter of the end portion is less than the inner diameter of the thread it may be plain.

Providing screw-threaded portions at both ends of both draw-bars has the advantage that the integral heads are eliminated. This improves the swept outline of the brake since no additional space is required to accommodate the heads.

The abutment members may comprise washers of generally "C" outline or split collets which are retained in position by means of circlips.

In one construction the friction pad assemblies are guided to slide between spaced drag-taking abutment surfaces in the carrier member and the draw-bars extend through clearance openings in the carrier member, the actuating means being housed in one of the pressure plates against which the nuts abut, and the threaded portions at the ends of the draw-bars remote from the nuts being screwed into the bores which are provided in the other or reaction pressure plate which acts on the second friction pad assembly.

Two embodiments of our invention are illustrated in the accompanying drawings in which.

Figure 1:
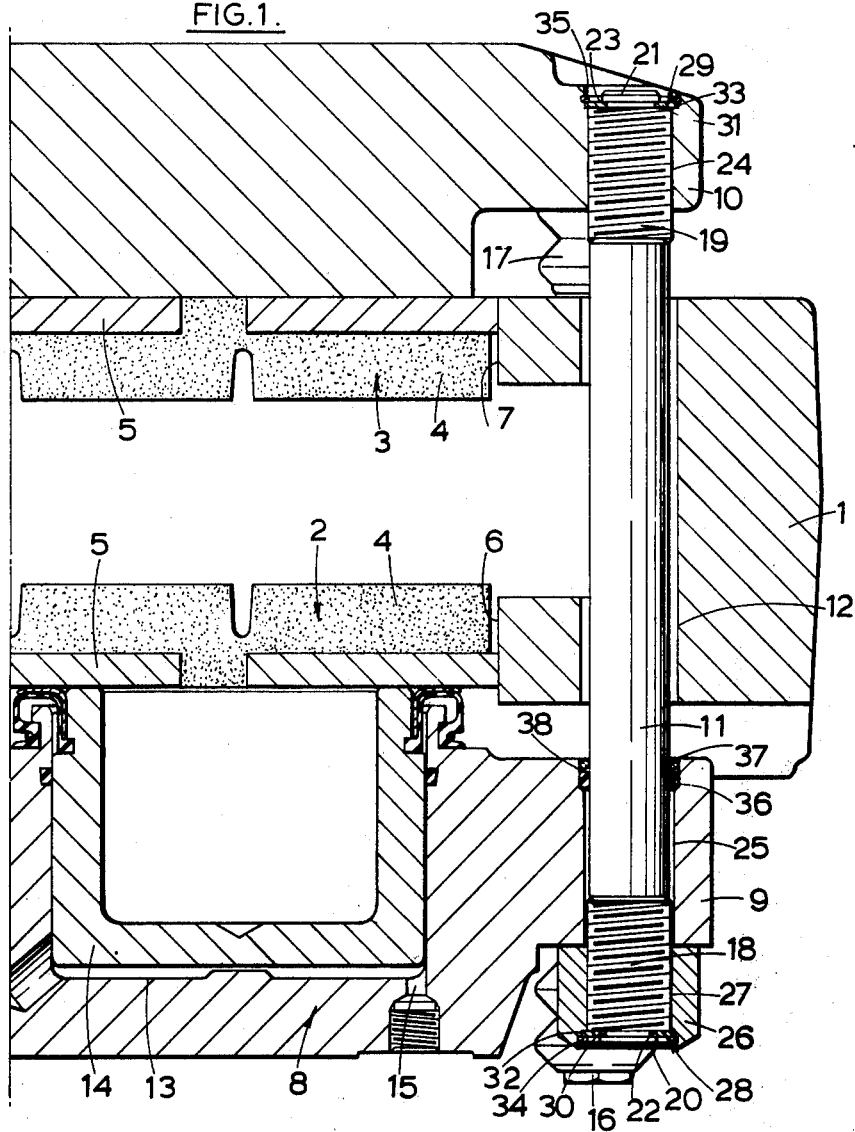
FIG. 1 is a section through one circumferential half of a disc brake.
Figure 2:
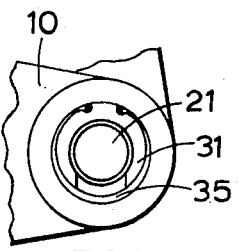
FIG. 2 is an elevation of a portion of a pressure-plate into which a draw-bar is screwed.

The disc brake for vehicles illustrated in the accompanying drawings comprises a carrier member 1 of generally U-shaped outline which straddles the peripheral edge of a disc 50 and is mounted on a stationary part adjacent to one face of the disc.

Friction pad assemblies 2, 3 for engagement with opposite faces of the disc are guided for movement towards and away from the disc 50 in the staionary member 1. Each friction pad assembly 2, 3 comprises a pad 4 of friction material for engagement with the disc, and a rigid backing plate 5 carrying the pad 4 and having end edges slidably engaged with drag-taking abutment surfaces 6, 7 in the carrier member 1.

A clamping member 8 comprising a yoke assembly fitting over the disc comprises a pair of pressure plates in the form of an actuating beam 9 and a reaction beam 10 which are chordal with respect to the disc, and a pair of circumferentially spaced circular draw-bars 11 which extend through clearance openings 12 in carrier member 1. The draw-bars 11 interconnect the pressure plates 9 and 10 at their outermost ends.

The actuator beam 9 is provided with a pair of hydraulic cylinders of which one is shown at 13, and an hydraulic piston 14 working in each cylinder acts on the friction pad assembly 2 to apply it directly to the disc when the cylinder 13 is pressurised through a passage 15. The reaction urges the actuating beam in the opposite direction in turn acting through the draw-bars 11 to apply the pad assembly 3 to the opposite face of the disc through the reaction beam 10.

The drag on the friction pad assemblies 2 and 3 when the brake is applied is taken by the surfaces 6, 7 and the clamp member 8 is located on the carrier member 1 on both sides of the disc in a known manner by pairs of booted pins 16 and 17.

In accordance with our invention each draw-bar 11 is provided at opposite ends with threaded portions 18 and 19, each terminating in an end portion 20, 21 of reduced diameter between which and the threaded portion 18, 19 is provided a radial groove 22, 23.

Each threaded portion 19 is screwed into an open-ended threaded bore 24 in the reaction beam 10, and the opposite end of each draw-bar projects through a clearance bore 25 in the actuating beam 9 to receive a nut 26 having an open-ended threaded bore 27.

A releasable coupling 28, 29 is provided between each end of the draw bar 11 and the nut 26 and the reaction beam 10 respectively. As illustrated each coupling comprises an abutment member comprising a washer 30, 31 of generally "C" outline which is of substantially the same thickness as the groove 22, 23 and which is received therein. The washer 30 is of an external diameter greater than that of the draw-bar 11 and is received in a groove in a counterbore 32, 33 in the outer end of the bore 27, 24 one face of the groove defined by a shoulder at the step at the change in diameter, and the opposite face of the groove comprising a circlip 34, 35 releasably located in circlip grooves in the counterbore 32, 33. The washers 30, 31 can be released from the counterbore by removing the circlips 34, 35.

In assembling the brake each draw-bar 11 is first screwed through the bore 24 until the groove 23 projects from the reaction beam 10 by an distance sufficient to receive the washer 31. The draw-bar is then screwed in the opposite direction until the washer 31 engages with the stop face whereafter the circlip 35 is inserted to retain the washer 31 in position, determining a relative axial position for the draw-bar and locking the bar against rotation relative to the reaction beam 10.

The opposite end of each draw-bar is then inserted through the bore 12 and 25 and the nut 26 screwed onto the threaded portion 18 until the groove 22 projects from the nut 26 to receive the washer 30. Thereafter the nut 26 is screwed back in the opposite direction to clamp the washer 30 against the stop face whereafter the circlip is inserted to retain the washer 30 in position, determining an axial position of the draw-bar with respect to the nut 26 and locking the draw-bar and the nut 26 against relative rotation.

The axial distance between the grooves 22 and 23 and the location of the stop faces in the reaction beam 10 and the nut 26 determines the effective or set length of the draw-bars 11.

An "O" ring 36 and a spring ring 37 retainer act between each draw-bar 11 and a counterbore 38 at the inner end of the clearance bore 25 to prevent rattle.

Figure 3:
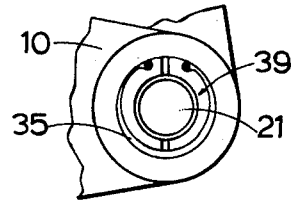
FIG. 3 is a view similar to FIG. 2 but showing a modification.
Figure 4:
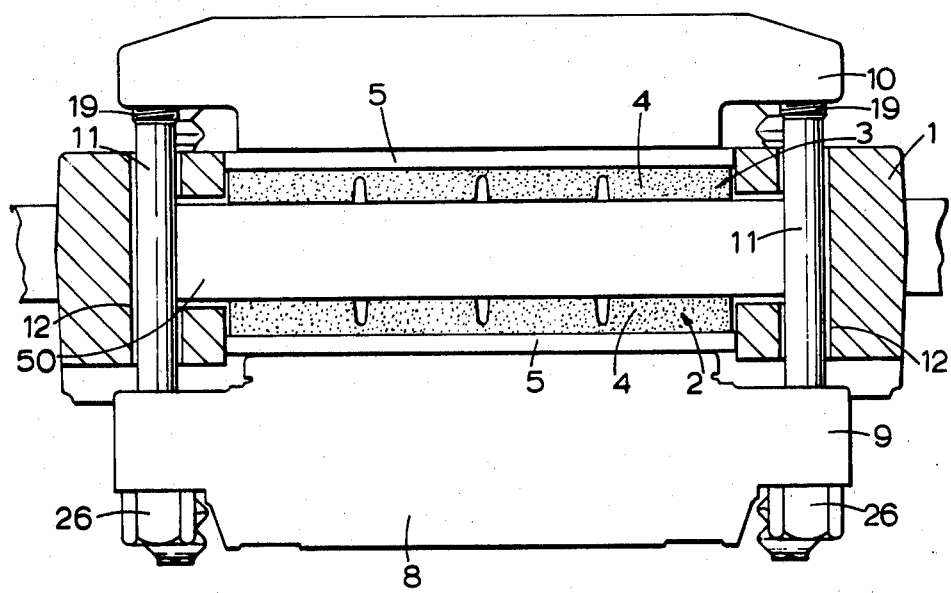
FIG. 4 is a plan view of the disc brake.

In the modified construction illustrated in FIG. 3 each washer 30, 31 can be replaced by a two-part washer in the form of a split collet 39.

The circlips 34 and 35 may be axially resilient to compensate for variations in the tolerances of the grooves in which they are located and to avoid rattle. For example, the circlips 34, 35 may be bowed, wavy or of conical outline.

In a modification, a resilient washer may be inserted between the circlip 34, 35 and the washer 30, 31. The purpose of providing resilience in the groove is that the tendency of the draw-bar to turn on its thread under heavy vibration is reduced. If the bar should turn, it would adopt a new axial position within the clearances permitted by the fit of the washers and circlip in the groove.

I claim:

1. A disc brake comprising first and second friction pad assemblies for engagement with opposite faces of a rotatable disc, a relatively stationary carrier member, actuating means for urging said first friction pad assembly directly into engagement with a first face of said disc, a clamping member straddling a portion of the periphery of said disc, said clamping member comprising first and second pressure plates which are chordal to said disc and are located on opposite sides thereof with said first pressure plate located adjacent to said first friction pad assembly, said second pressure plate acting on said second friction pad assembly, and circumferentially spaced draw-bars which interconnect said pressure plates at the outermost ends there of and determine the axial spacing between said pressure plates, the reaction of said actuating means acting indirectly on said second friction pad assembly through said second pressure plate such that said second friction pad assembly is applied to a second face of said disc opposite said first face, a first end of at least one of said draw-bars having a screw-threaded portion an end portion and a groove between said portions, a member having a screw-threaded bore into which said screw-threaded portion is screwed, means defining a groove in said bore, a releasable coupling between said one end of the said one draw-bar and said member having a screw-threaded bore, said releasable coupling comprising an abutment member retained by said groove-defining means in said member and engaged within said groove in said first end of said draw-bar.

2. A disc brake as claimed in claim 1 wherein said end portion is of a diameter less than that of said screw-threaded portion.

3. A disc brake as claimed in claim 1 wherein said member having a screw-threaded bore comprises one of said pressure plates.

4. A disc brake as claimed in claim 1, wherein said member having a screw-threaded bore comprises a nut, one of said pressure plates having a clearance bore and said nut being screwed onto said screw-threaded portion of said draw-bar which projects through said clearance bore.

5. A disc brake as claimed in claim 1, wherein both ends of each draw-bar have a screw-threaded portion, an end portion and a groove between said portions one of said pressure plates having open ended bores into which said screw-threaded portions at one end of said draw-bars are screwed, the other of said pressure plates having clearance bores through which said screw-threaded portions at the opposite end of said draw-bars are passed, a nut having an open-ended screw-threaded bore being screwed onto the end of each screw-threaded portion which projects through each of said clearance bores, releasable couplings being provided at both ends of each draw-bar, means defining a groove in each open-ended bore, each of said couplings comprising an abutment member retained in said bore by said groove defining means and engaged within one of said grooves in said draw-bar.

6. A disc brake as claimed in claim 5, wherein said open-ended bores are counterbored, and each of said groove defining means comprises a shoulder at the step in the change in diameter defining one face of a groove and a circlip defining the opposite face of said groove, said counterbore having a groove in which said circlip is releasably located such that said circlip can be released from said groove to allow said abutment member to be removed from said counterbore.

7. A disc brake as claimed in claim 1, wherein said abutment member comprises a washer of generally "C" outline and a circlip retains said washer in position.

8. A disc brake as claimed in claim 7, wherein said circlip is axially resilient.

9. A disc brake as claimed in claim 7, wherein a resilient washer is inserted in said groove between said abutment member and said circlip.

10. A disc brake as claimed in claim 1, wherein said abutment member comprises a split collet, and a circlip retains said collet in position.

11. A disc brake as claimed in claim 10, wherein said circlip is axially resilient.

12. A disc brake as claimed in claim 10, wherein a resilient washer is inserted in said groove between said abutment member and said circlip.

13. A disc brake as claimed in claim 1, wherein said carrier member has spaced drag-taking abutment surfaces between which said friction pad assemblies are guided to slide and clearance openings through which said draw-bars extend, said actuating means being housed in said first pressure plate and said second pressure plate having bores into which said threaded portions, at ends of said draw-bars remote from said first pressure plate are screwed.

14. A disc brake as claimed in claim 1, wherein said bore is counterbored and said groove defining means comprises a shoulder at the step in the change in diameter defining one face of a groove and a circlip defining the opposite face of said groove, said counterbore having a groove in which said circlip is releasably located such that said circlip can be released from said groove to allow said abutment member to be removed from said counterbore.

* * * * *